(12) United States Patent
Lee (10) Patent No.: US 8,924,376 B1
(45) Date of Patent: Dec. 30, 2014

(54) METHOD FOR HUMAN RANKING OF SEARCH RESULTS

(76) Inventor: Bryant Christopher Lee, Bethesda, MD (US)

( * ) Notice: Subject to any disclaimer, the term of this patent is extended or adjusted under 35 U.S.C. 154(b) by 0 days.

(21) Appl. No.: 13/487,868

(22) Filed: Jun. 4, 2012

Related U.S. Application Data (63) Continuation-in-part of application No. 12/944,842, filed on Nov. 12, 2010, now abandoned.

(60) Provisional application No. 61/299,994, filed on Jan. 31, 2010, provisional application No. 61/302,117, filed on Feb. 6, 2010.

(51) Int. Cl.
*G06F 17/30* (2006.01)
*G06F 7/00* (2006.01)

(52) U.S. Cl.
USPC .......................................... 707/723; 707/732

(58) Field of Classification Search
CPC ..................... G06F 17/30864; G06F 17/30867
USPC .......... 707/706, 722, 723, 758, 769, 999.003, 707/748, 749, 751
See application file for complete search history.

(56) References Cited

U.S. PATENT DOCUMENTS

| | | | |
|---|---|---|---|
| 7,340,438 B2 | 3/2008 | Nordman | |
| 7,418,661 B2 | 8/2008 | Brandenberger | |
| 7,472,119 B2 | 12/2008 | Dai | |
| 7,599,911 B2 * | 10/2009 | Manber et al. | 1/1 |
| 7,599,950 B2 | 10/2009 | Walther | |
| 8,214,380 B1 * | 7/2012 | Bettinger et al. | 707/758 |
| 8,312,009 B1 * | 11/2012 | Bostock | 707/723 |
| 8,620,915 B1 * | 12/2013 | Brukman et al. | 707/733 |
| 2002/0083090 A1 | 6/2002 | Jeffrey | |
| 2003/0023754 A1 | 1/2003 | Eichstadt | |
| 2004/0078432 A1 | 4/2004 | Manber | |
| 2004/0210602 A1 | 10/2004 | Hillis | |
| 2005/0160356 A1 | 7/2005 | Albornoz | |
| 2005/0216454 A1 | 9/2005 | Diab | |
| 2005/0262427 A1 | 11/2005 | Cantwell | |
| 2006/0026147 A1 * | 2/2006 | Cone et al. | 707/3 |
| 2006/0206462 A1 | 9/2006 | Barber | |
| 2006/0235860 A1 * | 10/2006 | Brewer et al. | 707/100 |
| 2006/0271524 A1 * | 11/2006 | Tanne et al. | 707/3 |
| 2008/0243830 A1 * | 10/2008 | Abhyanker | 707/5 |
| 2009/0077071 A1 * | 3/2009 | Mishkanian et al. | 707/5 |
| 2009/0164929 A1 * | 6/2009 | Chen et al. | 715/769 |
| 2009/0234834 A1 * | 9/2009 | Cozzi | 707/5 |
| 2009/0287682 A1 | 11/2009 | Fujioka | |
| 2010/0106703 A1 * | 4/2010 | Cramer | 707/706 |
| 2010/0180217 A1 * | 7/2010 | Li | 715/758 |

(Continued)

OTHER PUBLICATIONS

Carlos Castillo and Brian D. Davison, Adversarial Web Search, Foundations and Trends in Information Retrieval, vol. 4, No. 5, pp. 377-486 (2010).

(Continued)

*Primary Examiner* — Alicia Lewis (57) ABSTRACT

A search engine may perform a search for a user search query. A rankings of result items may be returned as a result of the search. The user may enter new suggested rankings for some of the items. The new suggested rankings may change the rankings of result items when other users search for the same search query or a similar search query at a later time.

20 Claims, 6 Drawing Sheets

(56) References Cited

U.S. PATENT DOCUMENTS

| | | |
|---|---|---|
| 2011/0191317 A1 | 8/2011 | Lee |
| 2011/0246456 A1* | 10/2011 | Weitz et al. .................... 707/724 |
| 2014/0129534 A1* | 5/2014 | Riley et al. .................... 707/706 |

OTHER PUBLICATIONS

Dennis Fetterly, Adversarial Information Retrieval: The Manipulation of Web Content, ACM Computing Reviews (Jul. 2007). Available at http://www.computingreviews.com/hottopic/hottopic_essay_06.cfm.

Monika R. Henzinger, Rajeev Motwani, Craig Silverstein, Challenges in Web Search Engines, SIGIR Forum, vol. 37, No. 2 (2002). Available at citeseerx.ist.psu.edu/viewdoc/summary?doi=10.1.1.97.2915.

Wikipedia, Google Bomb (last modified Jul. 5, 2013). Available at http://en.wikipedia.org/wiki/Google_bomb. Accessed Jul. 12, 2013.

Peter A. Hamilton, Google-bombing—Manipulating the PageRank Algorithm. Available at http://userpages.umbc.edu/~pete5/ir_paperpdf. Accessed Jul. 12, 2013.

Search Engine People, The 10 Most Incredible Google Bombs (Nov. 9, 2010). Available at http://www.searchenginepeople.com/blog/incredible-google-bombs.html. Accessed Jul. 26, 2013.

Google Operating System (blog), Knowledge Graph and Google Bombs (Jun. 16, 2013). Available at http:// googlesystem.blogspot.com/2013/06/knowledge-graph-and-google-bombs.html. Accessed Jul. 22, 2013.

Nadav Eiron, Kevin S. McCurley, and John A. Tomlin, Ranking the Web Frontier, Proceedings of the 13th Int'l Conference on World Wide Web, pp. 309-318 (2004). Available at http://www.mccurley.org/papers/1p309.pdf.

Zoltan Gyongyi and Hector Garcia-Molina, Spam: It's Not Just for Inboxes Anymore, IEEE Computer Magazine, vol. 38, No. 10, pp. 28-34 (2005). Available at http://cs.furman.edu/~chealy/fys1107/PAPERS/web%20spam.pdf.

Outspoken Media, Surviving Personalization with Bing & Google, presented at SMX Advanced (2012). Available at http://www.slideshare.net/rdrysdale/surviving-personalization-with-bing-and-google-smx-advanced-2012. Accessed Jul. 14, 2013.

Google Official Blog, Personalized Search for Everyone (Dec. 4, 2009). Available at—http://googleblog. blogspot.com/2009/12/personalized-search-for-everyone.html. Accessed Jul. 12, 2013.

Bing, Adapting Search to You (Sep. 14, 2011). Available at—http://www.bing.com/blogs/site_blogs/b/search/archive/2011/09/14/adapting-search-to-you.aspx. Accessed Jul. 12, 2013.

Dow Jones Business News, ComScore: Google's Search Engine Market Share Holds Steady in Jun. (Jul. 12, 2013). Available at http://www.nasdaq.com/article/comscore-googles-search-engine-market-share-holds-steady-in-june-20130712-00518. Accessed Jul. 14, 2013.

CNET News, Google Takes Searching Personally (Mar. 29, 2004). Available at http://news.cnet.com/2100-1032-5181049.html. Accessed Jul. 12, 2013.

CNET News, Google Automates Personalized Search (Jun. 28, 2005). Available at http://news.cnet.com/2100-1032_3-5766899.html. Accessed Jul. 12, 2013.

Google Search, Search Results Page for "Greek Restaurants" (conducted Jul. 12, 2013).

Bing, Search Results Page for "Greek Restaurants" (conducted Jul. 12, 2013).

CNET News, Google Goes Local (Mar. 17, 2004). Available at http://news.cnet.com/Googlegoes-local/2100-1038_3-5173685.html. Accessed Jul. 14, 2013.

Frederic Lardinois, Google Updates Local Search Results on Desktop with Carousel Design (Jun. 18, 2013). Available at http://techcrunch.com/2013/06/18/google-updates-local-search-results-on-desktop-with-carousel-design/. Accessed Jul. 14, 2013.

Fenq Qiu and Junghoo Cho, Automatic Identification of User Interest for Personalized Search, Proceedings of the 15th Int'l Conference on World Wide Web, pp. 727-736 (2006). Available at http://oak.cs.ucla.edu/~cho/papers/qiu-ui.pdf.

Xuehua Shen, Bin Tan, and Chengxiang Zhai, Implicit User Modeling for Personalized Search, Proceedings of the 14th ACM Int'l Conference on Information and Knowledge Management, pp. 824-831 (2005). Available at http:// sifaka.cs.uiuc.edu/czhai/pub/cikm05-ucair.pdf.

Nicolaas Matthijs and Filip Radlinski, Personalizing Web Search Using Long Term Browsing History, Proceedings of the Fourth ACM Int'l Conference on Web Search and Data Mining, pp. 25-34 (2011). Available at http://research.microsoft.com/pubs/139933/matthijsradlinski_wsdm2011.pdf.

Fabrizio Silvestri, Mining Query Logs: Turning Search Usage Data into Knowledge, Foundations and Trends in Information Retrieval, vol. 4, Nos. 1-2, pp. 1-174 (2010). Available at http://pomino.isti.cnr.it/~silvestr/wp-content/uploads/2011/02/fntir2010.pdf.

Filip Radlinski and Thorsten Joachims, Query Chains: Learning to Rank from Implicit Feedback, Proceedings of the Eleventh ACM SIGKDD Int'l Conference on Knowledge Discovery in Data Mining, pp. 239-248 (2005). Available at http://www.cs.cornell.edu/people/tj/publications/radlinski_joachims_05a.pdf.

ARS Technica, Yahoo Now Officially Powered by Bing in U.S., Canada (Aug. 24, 2010). Available at http:// arstechnica.com/information-technology/2010/08/yahoo-transition-to-bing-finalized-in-us-canada/. Accessed Jul. 14, 2013.

U.S. Appl. No. 12/983,363 by Bryant Christopher Lee.

U.S. Appl. No. 13/872,138 by Bryant Christopher Lee.

Wikipedia, currently available web site product provided by Wikimedia Foundation, operable at www.wikipedia.org, created in 2001, example exhibits provided herein in the form of screenshots and content.

The CAPTCHA Project, "The Captcha Project: Gimpy", http://web.archive.org/web/20011201050359/www.captcha.net/gimpy.html, pp. 1 (accessed Feb. 2, 2011).

* cited by examiner

Michael Jordan   SEARCH

Results

NBA.com: Michael Jordan Bio    [Move]
Michael Jordan. Season Statistics and Notes.
Season Splits. Gamey-by-game stats ...
www.nba.com/playerfile/Michael_Jordan.html Michael Jordan NBA & ABA Statistics    [Move]
Michael Jeffrey Jordan (Air Superman, Mike,
M.J., Air Jordan) Position: Guard-forward.
Height: 6-6. Weight: 195 lbs.
www.basketball-reference.com/Coaches/J Michael Jordan – Wikipedia    [Move]
Michael Jeffrey Jordan is a retired American
Professional basketball player ...
en.wikipedia.org/Michael_Jordan Michael Jordan – IMDB    [Move]
Michael Jordan, Actor: Space Jam. Michael
Jeffrey Jordan was born in Brooklyn, New
York on February 17, 1963. He was the fourth
of five children ...
www.imdb.com/name/nm0003044

Michael Jordan Virtual Gallery    [Move]
The Michael Jordan Virtual Gallery was the
first and is the last MJ tribute page on the
Internet. It was the first to feature Michael
Jordan in Flash and ...
www.virtualfans.com                340

| Michael Jordan | SEARCH |

Results

Michael Jordan – Wikipedia      [Move]
Michael Jeffrey Jordan is a retired American
Professional basketball player …
en.wikipedia.org/Michael_Jordan NBA.com: Michael Jordan Bio      [Move]
Michael Jordan. Season Statistics and Notes.
Season Splits. Gamey-by-game stats …
www.nba.com/playerfile/Michael_Jordan.html Michael Jordan NBA & ABA Statistics      [Move]
Michael Jeffrey Jordan (Air Superman, Mike,
M.J., Air Jordan) Position: Guard-forward.
Height: 6-6. Weight: 195 lbs.
www.basketball-reference.com/Coaches/J Michael Jordan – IMDB      [Move]
Michael Jordan, Actor: Space Jam. Michael
Jeffrey Jordan was born in Brooklyn, New
York on February 17, 1963. He was the fourth
of five children …
www.imdb.com/name/nm0003044

Michael Jordan Virtual Gallery      [Move]
The Michael Jordan Virtual Gallery was the
first and is the last MJ tribute page on the
Internet. It was the first to feature Michael
Jordan in Flash and …
www.virtualfans.com 401  402

Enter URL: [______]

Submit

METHOD FOR HUMAN RANKING OF SEARCH RESULTS

CROSS-REFERENCE TO RELATED APPLICATIONS

This application is a continuation-in-part of U.S. application Ser. No. 12/944,842, filed Nov. 12, 2010, which claims priority from U.S. provisional patent application Ser. No. 61/299,994 filed Jan. 31, 2010 and U.S. provisional patent application Ser. No. 61/302,117 filed Feb. 6, 2010.

FIELD OF THE INVENTION

The present invention relates generally to search engines, and more particularly, to methods of ranking search results and to user interfaces that are used to display search results.

BACKGROUND

The Internet is a system of interconnected computer networks, which allows computer systems on the Internet to communicate with each other. Computers may communicate according to certain services such as electronic mail and the World Wide Web (WWW or "the web"). The WWW service is a system of interlinked hypertext documents. Documents on the web can be viewed with web browsers. Web pages, text, images, videos, and other multimedia are all types of media that can be accessed in a web browser. To view a document on the web, a client computer would usually send a request to a web server that is hosting web content. The client computer may identify the requested resource using an identifier such as a Uniform Resource Locator (URL). The web server would respond to the request by sending the appropriate document to the client computer. The client computer can display the document in a web browser. Web pages can be specified in many formats and languages. Sometimes, the web pages may include scripts, which are executable code. Web pages may also be backed by a database. Access to a web page may cause code to be executed on the web server and may cause accesses to a database. Web applications may also be Rich Internet Applications (RIAs) that operate on a software platform such as Flash or Silverlight. An RIA may require installation of the software platform on the client computer, for example by browser plug-in, in order to function.

Search engines assist users in finding relevant documents or other informational content from among a larger corpus. A common application of search engines is to assist users in finding information, documents, and files that are located on a network. A common application of search engines is to assist users in finding information, documents, and files on the World Wide Web ("Web"), which comprises a massive network of Web documents. The user submits a word or phrase he or she is interested in, called a search query, and the search engine seeks to provide a list of high quality Web documents that are relevant to that query. The list of Web documents is usually ranked with higher-quality and more relevant documents appearing first.

The ranking is conventionally done by computerized methods such as examination of the contents of the Web documents or by examining the link structure of the Web documents. For example, a search engine may examine the words on a web document and assign an importance ranking according to how similar or related the words on the web document are to the search query. For example, a search engine may examine the link structure of a web document and assign an importance ranking according to which other documents link to the document and which other documents the document links to. For example, a search engine may assign an importance ranking to a document based on the user's search history. For example, a search engine may assign an importance ranking to a document based on whether the user has previously navigated to and made a purchase from that document.

One problem with search engines is that the methods of ranking documents often do not produce rankings that users believe to be an accurate reflection of relevance or quality. Often, a Web document that users believe to be the highest quality and most relevant is not listed first or second or anywhere near the top of the results list. A second problem is that users who notice this problem do not have a means to fix it so that future users who search for the same query can receive better search results.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the invention is directed to a method that includes receiving at a computer system a search query from a user. The method includes performing a search over a set of data in response to the search query. The method includes generating a rankings of a set of result items from the search over the set of data. The method includes adjusting the rankings of the set of result items by a method of using human suggested rankings comprising: retrieving from a database previously suggested rankings of result items that were provided by other users; and adjusting the rankings of the set of result items based on the retrieved previously suggested rankings of result items that were provided by the other users to obtain an adjusted rankings of the set of result items. The method includes displaying the adjusted rankings of the set of result items in a results document, wherein the user may enter suggested rankings for zero, one, or more result items in the results document, such suggested rankings to be stored in the database to be available for potential later use.

One aspect of the invention is directed to a method that includes receiving at a computer system a search query from a user. The method includes performing a search over a set of data in response to the search query. The method includes generating a rankings of a set of result items from the search over the set of data. The method includes adjusting the rankings of the set of result items by a method of using human suggested rankings comprising: retrieving from a database previously suggested rankings of result items that were provided by other users; the previously suggested rankings of result items containing suggested rankings for some of the result items in the set of result items; the other users having conducted a search using the same search query earlier in time; the other users having entered the suggested rankings of result items after being displayed with the results of their search using the same search query earlier in time; and adjusting the rankings of the set of result items based on the retrieved previously suggested rankings of result items that were provided by the other users to obtain an adjusted rankings of the set of result items. The method includes displaying the adjusted rankings of the set of result items in a results document, wherein the user may enter suggested rankings for zero, one, or more result items in the results document, such suggested rankings to be stored in the database to be available for potential later use in adjusting the rankings of a later set of result items returned in response to a later search queries of a later users.

One aspect of the invention is directed to adjusting the rankings of the set of result items based on the retrieved previously suggested rankings of result items from the other users to obtain an adjusted rankings of the set of result items by a method comprising: re-ranking one or more result items in the set of result items to the last user-suggested ranking the one or more result items received from the other users, the other users having conducted a search using the same search query earlier in time.

One aspect of the invention is directed to adjusting the rankings of the set of result items based on the retrieved previously suggested rankings of result items from the other users to obtain an adjusted rankings of the set of result items by a method comprising: re-ranking one or more result items in the set of result items to an average user-suggested ranking the one or more result items have received from the other users, the other users having conducted a search using the same search query earlier in time.

One aspect of the invention is directed to adjusting the rankings of the set of result items based on the retrieved previously suggested rankings of result items from the other users to obtain an adjusted rankings of the set of result items by a method comprising: assigning two weights, the first weight being determined based on user-suggested rankings one or more result items in the set of result items have received from the other users, the other users having conducted a search using the same search query earlier in time, and the second weight being determined by the content, link structure, relevancy, quality, or other substantive qualities of one or more result items in the set of result items, and the two weights being used in combination to adjust the rankings of the one or more result items in the set of result items.

The invention improves on the prior art in at least the following ways: it may improve the quality of rankings of the set of result items returned as a result of a user search so that more relevant result items are ranked higher and less relevant result items are ranked lower; and it allows users to improve the quality of rankings of the set of result items for later users.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by the appended claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention. In addition, it should be understood that steps of a method can be performed in different orders than the order presented in this specification.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer means one or more computers. The term computer system means one or more computer systems. The term computer server means one or more computer servers. The term computer-readable medium means one or more computer-readable media. The term database means one or more databases.

Embodiments of the invention may comprise one or more computers. Embodiments of the invention may comprise software and/or hardware. Some embodiments of the invention are software only and may reside on hardware. A computer may be special-purpose or general purpose. A computer is defined to include personal computers, desktop computers, laptop computers, mobile devices, cellular phones, smart phones, PDAs, pagers, multi-processor systems, microprocessor-based or programmable consumer electronics, cloud computers, tablets, minicomputers, mainframe computers, and the like. Embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. Computer-readable media are physical media that can be accessed by a computer. Examples of computer-readable media include, but are not limited to, RAM, ROM, hard disks, flash memory, DVDs, CDs, magnetic tape, and floppy disks.

Computer-executable instructions comprise, for example, instructions and optional data which cause a computer to perform a function or group of functions. Computer executable instructions may be binaries, intermediate format instructions such as assembly language, source code, and the like. A computer program is software that comprises multiple computer executable instructions.

A network comprises one or more data links that enable the transport of electronic data. Networks can connect computer systems. The term network includes local area network (LAN), wide area network (WAN), or the Internet.

The term "user" refers to an end user. It should not be construed to refer to a professional reviewer.

Figure 1:
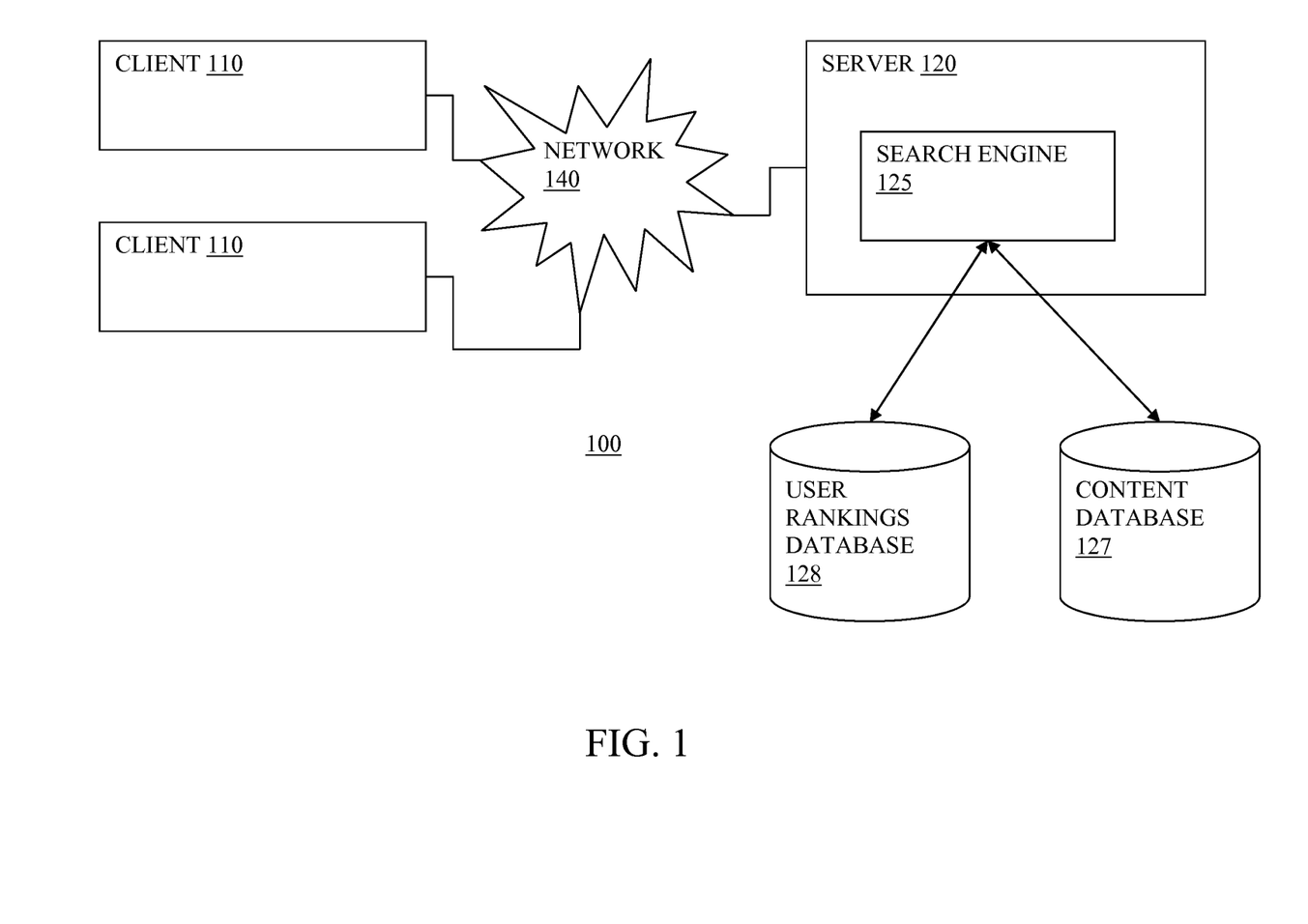
FIG. 1 is a diagram illustrating an exemplary environment in which one embodiment of the present invention may operate.

FIG. 1 is a block diagram illustrating an exemplary network environment for implementation of one embodiment of the present invention. The network environment 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and one server 120 have been illustrated for simplicity, though in practice there may be more or fewer clients and servers.

Clients 110 may be personal computers, digital assistants, personal digital assistants, cellular phones, mobile phones, smart phones, pagers, digital tablets, laptop computers, Internet appliances, and other processor-based devices. Clients may be client computing devices. Client computing devices may be personal computers, digital assistants, personal digital assistants, cellular phones, mobile phones, smart phones, pagers, digital tablets, laptop computers, Internet appliances, and other processor-based devices. Servers 120 may include entities that process, search, and/or maintain documents or files in a manner consistent with the principles of the invention. Server 120 may be implemented as a number of networked server devices, though it is illustrated as a single entity.

Server 120 may include a search engine 125 that can receive search queries from clients 110. In one embodiment, the search engine 125 may function as a query-based web page search engine. The search engine may cause the output, such as the display, of search results on the client 110. The search results may be in the form a results document. The results document may contain a set of result items.

In one embodiment, the search engine 125 processes search queries for documents located on the network. It may process queries by searching the content database 127 in which documents and/or index information about documents on the network are stored. It may return a set of documents and/or index information (called the set of result items) and may rank this set of result items according to relevancy and quality.

In one embodiment, the search engine then accesses the user rankings database 128 to access previous user-suggested rankings of result items for the search query. A user-suggested ranking of a result item is a ranking of the result item that was suggested by a user. The search engine may adjust the results rankings based on these suggested rankings.

Those skilled in the art will appreciate that the documents and/or index information about documents in the content database 127 and the user-suggested ranks in the user rankings database 128 may be stored in a single database or in more or fewer databases. Alternatively, they may be stored in a networked system of databases. It is for simplicity of illustration that these elements are described as residing in two different databases. The term database as used in this patent may refer to a computer database or any data storage or network of data storage.

The term "re-rank" is used in this patent to mean giving a result item a new rank in a set of search results. A computer can re-rank a result item to a new rank. A human can re-rank a result item to a new rank, for example by suggesting a new rank for the item via an interface component.

Figure 2:
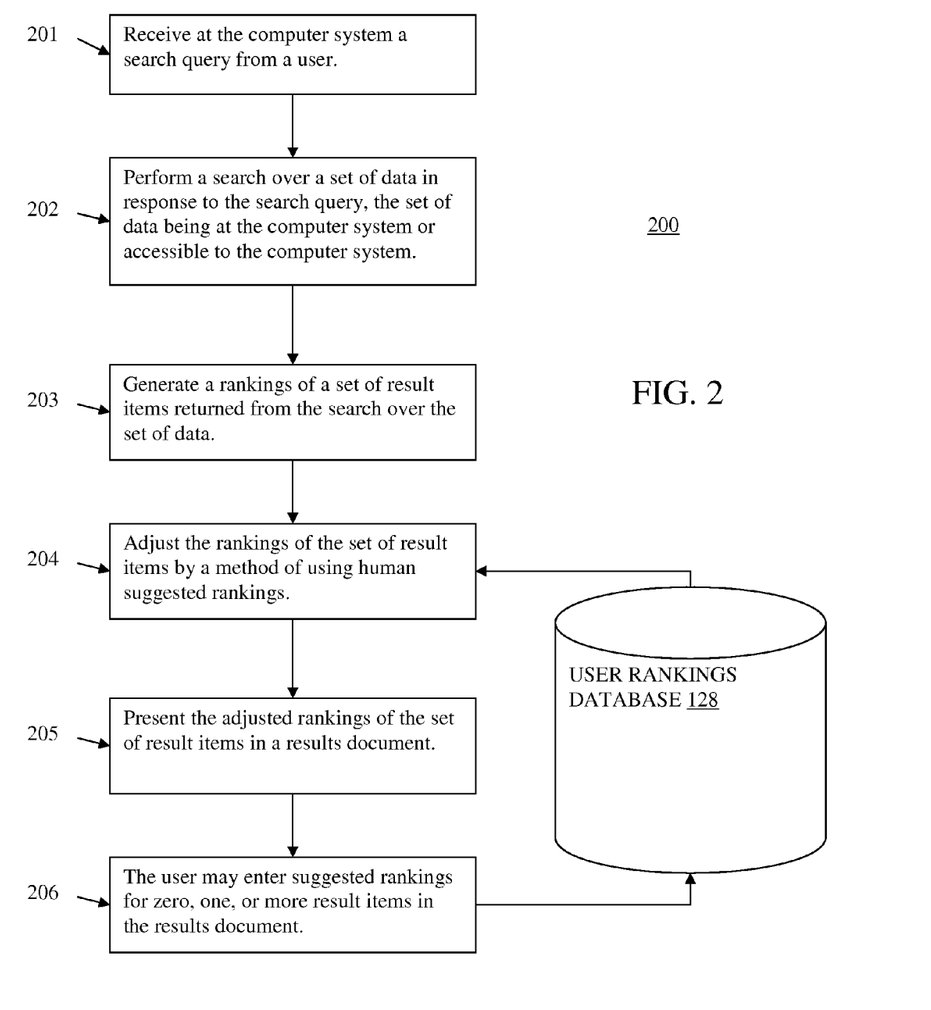
FIG. 2 is a flow diagram illustrating operations that may be performed for human ranking of search results in one embodiment of the present invention.

FIG. 2 is a flow chart illustrating an example method 200 that may be performed by search engine 125 consistent with aspects of the invention. Search engine 125 may receive a search query from a user (act 201). The search query may be received at the server 120. The user may provide the search query either at the server 120 or at a client 110 that is connected to the server 120 over the network 140. In response, the search engine may perform a search over a set of data, where the set of data is at the computer system or accessible to the computer system (act 202). The set of data that is searched over may be the content database 127. The search engine may generate a rankings of a set of result items returned from the search over the set of data (act 203). The step of generating a rankings of a set of result items may be performed by any conventional or nonconventional method of generating a rankings of a set of result items such as but not limited to: analysis of the content of the document and other documents or analysis of the link structure of the document and other documents. Generating a ranking can be performed by computerized methods, including but not limited to methods embodied in current search engines like Yahoo, Google, and Bing as well as by methods described in references such as U.S. Pat. No. 6,285,999. The search engine may adjust the rankings of the set of result items by a method of using human suggested rankings (act 204). Act 204 may include retrieving from the user rankings database 128 a previously suggested rankings of result items that were provided by a other users. The previously suggested rankings of result items contains suggested rankings for zero, one, or more of the result items in the set of result items. The previously suggested rankings of result items in the user rankings database 128 may have been provided by the other users, the other users having conducted a search using the same search query earlier in time. The previously suggested rankings of result items in the database may have been provided by the other users by entering suggested rankings of result items, the result items having been displayed in a prior results document that was returned after the other users conducted a search using the same search query earlier in time. The suggested rankings of result items may have been entered via such a prior results document that was returned to the other users. Act 204 may include adjusting the rankings of the set of result items based on the retrieved previously suggested rankings of result items that were provided by the other users to obtain an adjusted rankings of the set of result items. The search engine may display the adjusted rankings of the set of result items in a results document (act 205). The user may enter suggested rankings for zero, one, or more result items in the results document (act 206). Such suggested rankings are stored in the user rankings database 128 to be available for potential later use in adjusting the rankings of a later set of result items returned in response to a later search queries of a later users.

A suggested ranking for a result item in the user rankings database 128 may be a database entry with information regarding: the user who made the user-suggested ranking, the suggested ranking of the result item, the name or identifying information of the result item, the search query used by the user who made the user-suggested ranking to obtain the result item, the date and time that the suggested ranking was entered, and other information. A suggested ranking of a result item is a suggestion that the result item be ranked at a certain ranking. For example, a suggested ranking for website A may be a suggestion that the website A be ranked third in a set of result items returned when a user conducts a search using search query B. A suggested ranking is not merely an indication that a user recommended or did not recommend a website; is not merely an indication that a user voted up or voted down a website; is not merely a rating of a website on a scale for example from 1 to 5. Rather a suggested ranking indicates that a user made a suggestion that the result item be ranked at a certain ranking in the set of result items. The term "location" can also be used to refer to a certain location in the ordering. Thus, a user-suggested location is a suggestion to place an item at a certain location in the ordering.

In this patent, the term "same search query" is defined as a search query that is identical to another search query. The term "substantially similar search query" is defined to be a search query where it would be desirable to return similar results as another search query. For example, in some embodiments, a search query of "Michael Jordan" may be a substantially similar search query to "the Michael Jordan," "person Michael Jordan," "Michael Jordan basketball," and "Michael J basketball player." In some embodiments, the search queries that are substantially similar can be configured based on what queries the search engine provider believes should return similar results. For example, one could provide a list of search queries that are substantially similar or provide automatic rules for determining substantial similarity.

Although the invention is described with reference to using suggested rankings from other users who searched using the same search query earlier in time, instead in some embodiments the suggested rankings of other users who searched using a substantially similar search query could also be used. In such embodiments, when a user searches for a certain search query, the results are returned after taking into account the user-suggested rankings from other users who searched for substantially similar search queries earlier in time.

In one embodiment, the step in act 204 of adjusting the rankings of the set of result items based on the retrieved previously suggested rankings of result items that were provided by the other users to obtain an adjusted rankings of the set of result items may be accomplished by a method comprising: re-ranking one or more result items in the set of result items to the last user-suggested ranking the one or more result items received from the other users, the other users having conducted a search using the same search query earlier in time.

The last user-suggested ranking of a result item can be determined by comparing the date and time that user-suggested rankings of the result item were provided. An exemplary method comprises: comparing the date and time at which two or more user-suggested rankings were provided and selecting the user-suggested ranking provided at the latest date and time. If there is only one user-suggested ranking, it is the last user-suggested ranking.

Additional procedures may optionally be used to displace result items in the original ranking, as follows. The term "original ranking" is used to denote the ranking of the result items before the adjustment with user-suggested rankings. When a result item is re-ranked, it may displace a result item that was ranked at that location in the original ranking; said result item is moved down one rank if the re-ranked result item was ranked below it in the original ranking, and said result item is moved up one rank if the re-ranked result item was above it in the original ranking; this movement of said first result item may displace a second result item; the second result item is moved down one rank if the first result item was moved down, and the second result item is moved up if the first result item was moved up; the process is repeated for a third, fourth, fifth, and so on result items as necessary until no result items need to be re-ranked.

The above optional procedure for displacing result items can be elucidated by considering three cases.

First, suppose the result item with a user-suggested ranking was in the original rankings and the new re-ranked location is at a higher rank. Then the result item originally located at the higher rank is re-ranked down one to make room. This may displace a second item that may also be re-ranked down one. The process of re-ranking downwards continues so long as any result item remains displaced. However, the process will stop because eventually a result item is moved into the original rank of the result item with the user-suggested rank that was moved up.

For example, suppose result item C has a user-suggested ranking of 1. Suppose the original ranking is (A, B, C, D, E) signifying that A is first, B is second, C is third, D is fourth, and E is fifth. Then, the adjustment would return a ranking of (C, A, B, D, E).

Second, suppose the result item with a user-suggested ranking was in the original rankings and the new re-ranked location is at a lower rank. Then the result item originally located at the lower rank is re-ranked up one to make room. This may displace a second item that may also be re-ranked up one. The process of re-ranking upwards continues so long as any result item remains displaced. However, the process will stop because eventually a result item is moved into the original rank of the result item with the user-suggested rank that was moved down.

For example, suppose result item C has a user-suggested ranking of 5. Suppose the original ranking is (A, B, C, D, E). Then, the adjustment would return a ranking of (A, B, D, E, C).

Third, suppose the result item with a user-suggested ranking was not in the original rankings. This results in an addition of the result item at the user-suggested rank. The result item originally located at that rank is re-ranked down one to make room. This may displace a second item that may also be re-ranked down one. The process of re-ranking downwards continues so long as any result item remains displaced. However, the process will stop when all result items lower than the user-suggested rank have been re-ranked down. The process can also be stopped earlier, after re-ranking down only the result items on the page or that are displayed and doing further re-ranking down when the user moves to the next page of results or requesting a display of more results.

For example, suppose result item F has a user-suggested ranking of 3. Suppose the original ranking is (A, B, C, D, E). Then, the adjustment would return a ranking of (A, B, F, C, D, E).

When multiple items have to be re-ranked with a user-suggested ranking, the above procedures may be used iteratively on each item. Many different orders of iteration may be used. In some cases, it may be desirable to perform the procedures starting from the last user-suggested rankings that are oldest in time and iterate forward in chronological order. For instance, suppose the original ranking is (A, B, C, D, E) and a first user re-ranks E to 3, producing (A, B, E, C, D), and later a second user re-ranks D to 2. After applying the first user's re-ranking the ranking becomes (A, B, E, C, D) and after the second user's re-ranking the ranking becomes (A, D, B, E, C).

In some cases, multiple result items may have the same user-suggested rank. For example, a first user might rank item A at rank 3, but then a second user might rank item B at rank 3. In this case, the conflict can be resolved by giving precedence to the item with the user-suggested rank that was provided later in time. The result item with the earlier-in-time user-suggested ranking can be re-ranked down by one. Further result items displaced by this movement can also be re-ranked downwards.

However, many different procedures can be used to displace other result items after a result item has been re-ranked to its last user-suggested rank, and the above description of exemplary methods for displacing result items should not be viewed as limiting. For instance, other methods of displacing result items could take into account other factors such as the arrangement of items when the user who entered the last user-suggested rank entered that rank.

In one embodiment, the step in act 204 of adjusting the rankings of the set of result items based on the retrieved previously suggested rankings of result items that were provided by the other users to obtain an adjusted rankings of the set of result items may be accomplished by a method comprising: re-ranking one or more result items in the set of result items to an average user-suggested ranking the one or more result items have received from the other users, the other users having conducted a search using the same search query earlier in time. The average may be a mean, median, mode, weighted average, or other kind of average. The displacement of other result items by the re-ranking of some result items to their average user-suggested ranking can be performed in various ways including by the methods described above.

In one embodiment, the step in act 204 of adjusting the rankings of the set of result items based on the retrieved previously suggested rankings of result items that were provided by the other users to obtain an adjusted rankings of the set of result items may be accomplished by a method comprising: assigning two weights, the first weight being determined based on user-suggested rankings one or more result items in the set of result items have received from the other users, the other users having conducted a search using the same search query earlier in time, and the second weight being determined by the content, link structure, relevancy, quality, or other substantive qualities of one or more result items in the set of result items, and the two weights being used in combination to adjust the rankings of the one or more result items in the set of result items. The displacement of other result items by the re-ranking of some result items can be performed in various ways including by the methods described above.

In one embodiment, only user-suggested rankings are stored in the user rankings database and the re-rankings of items occurring solely because of displacement are not stored. In an alternative embodiment, the re-rankings of items occurring solely because of displacement can also be stored in the user rankings database.

Some embodiments of the invention may use a time-dependent method so as to allow more recent search items returned in the originally-returned rankings to take precedence over older user-suggested rankings. These embodiments use a concept of a "critical date" for result items in the original rankings. A critical date is some date that defines when the result item's original ranking should take precedence over user-suggested rankings. The term "date" should be construed to optionally include a time in addition to a date. Some examples of dates that could be used as critical dates are the date a result item was created (such as a web page creation date), the date a result item was added to the search engine index, and the date the result item was placed at a particular rank by the computer program generating the original ranking.

In one embodiment, the step in act 204 of adjusting the rankings of the set of result items based on the retrieved previously suggested rankings of result items that were provided by the other users to obtain an adjusted rankings of the set of result items may be accomplished by a method comprising: for each of the one or more result items having user-suggested rankings, starting at the last user-suggested ranking of the result item with user-suggested rankings and iterating downwards until an eligible rank is found that is filled by a result item having a critical date that is less recent than the date of the last user-suggested ranking of the result item with user-suggested rankings and re-ranking the result item with user-suggested rankings to the eligible rank; wherein the other users conducted a search using the same search query earlier in time.

Additional procedures may optionally be used to displace result items in the original ranking. Processes for displacing items when the result item with user-suggested ranking is placed at the user-suggested rank (i.e. the result item at the user-suggested rank has a less recent critical date) have previously been described. There are three additional cases to describe, which are described in terms of optional procedures that may be performed.

First, suppose the result item with a user-suggested ranking was in the original rankings and the new re-ranked location is at a higher rank; however, suppose the re-ranked location is filled by a result item with a more recent critical date. The result item with the user-suggested rank is re-ranked down until a location is found that has a result item with a less recent critical date. If all the result items between the re-ranked location and the original location of the result item with the user-suggested ranking are filled with items having a more recent critical date, then the result item with the user-suggested ranking simply ends up at its original ranking. However, if not, then some result items will be displaced and those result items should be re-ranked downwards, as has been described previously.

For example, suppose result item D has a user-suggested ranking of 1. Suppose the original ranking is (A*, B, C*, D, E) where items with a * indicate items having a more recent critical date than the re-ranked item. Then, the adjustment would return a ranking of (A*, D, B, C*, E).

Second, suppose the result item with a user-suggested ranking was in the original rankings and the new re-ranked location is at a lower rank; however, suppose the re-ranked location is filled by a result item with a more recent critical date. The result item with the user-suggested rank is re-ranked down until a location is found that has a result item with a less recent critical date. Once it is placed, its placement will displace other result items and those should be re-ranked downwards, as described previously. There will then be a hole in the rankings at the original ranking of the item with the user-suggested ranking. This hole can be filled by re-ranking up by 1 all of the items below that ranking.

For example, suppose result item C has a user-suggested ranking of 5. Suppose the original ranking is (A, B, C, D, E*). Then, the adjustment prior to filling the hole yields (A, B, -, D, E*, C), but after result items are re-ranked up to fill the hole the output is (A, B, D, E*, C). This result is identical to the outcome that would be achieved by moving the result item with the user-suggested ranking to the re-ranked location, re-ranking the result item at that location upwards (regardless of its critical date), and re-ranking further displaced result items upwards as necessary. Thus, that algorithm can be used as well.

Third, suppose the result item with a user-suggested ranking was not in the original rankings; however, suppose the re-ranked location is filled by a result item with a more recent critical date. The result item with the user-suggested rank is re-ranked down until a location is found that has a result item with a less recent critical date. Once it is placed, its placement will displace other result items and those should be re-ranked downwards, as described previously.

For example, suppose result item F has a user-suggested ranking of 3. Suppose the original ranking is (A, B, C*, D, E). Then, the adjustment would return a ranking of (A, B, C*, F, D, E).

When multiple items have to be re-ranked with a user-suggested ranking, the above procedures may be used iteratively on each item.

In some cases, multiple result items may have the same user-suggested rank, not just because two result items have the same user-suggested rank given by different users, but also because some items with a higher user-suggested rank can be re-ranked down due to ranks being filled by result items having a more recent critical date. As before, conflicts can be resolved by giving precedence to the item with the user-suggested rank that was provided later in time. The result item with the earlier-in-time user-suggested ranking can be re-ranked down by one. Further result items displaced by this movement can also be re-ranked downwards. Alternatively, conflicts can be resolved by giving precedence to the item that has the higher user-suggested rank. The result item with the lower user-suggested ranking can be re-ranked down by one (and further result items displaced by this movement can also be re-ranked downwards).

However, many different procedures can be used to displace other result items after a result item has been re-ranked to its last user-suggested rank with consideration of critical dates, and the above description of exemplary methods for displacing result items should not be viewed as limiting. For instance, other methods of displacing result items could take into account other factors such as the arrangement of items when the user who entered the last user-suggested rank entered that rank.

In one embodiment, when a user suggests a new ranking for an item, the item is re-ranked to the suggested ranking, the other items are displaced accordingly, and the rankings of all or less than all of the items in the search results list are stored in the user rankings database. In this embodiment, adjusting the rankings of the search items according to user-suggested rankings may be accomplished by retrieving the rankings for all or less than all of the items from the user rankings database.

Those skilled in the art will recognize that adjusting the rankings of the search items according to user suggested rankings (act 204) may be performed according to many different methods and processes. The foregoing description of preferred embodiments of act 204 provides illustration and description, but is not intended to be exhaustive or to limit the implementation of act 204 to the precise forms disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

In one embodiment, the user may not suggest rankings of items unless the user has a user account and is logged in to the user account. In one embodiment, the user may not suggest rankings of items unless the user has editing permissions. Editing permissions may be given to all or less than all of the users of the invention. Editing permissions may be given or taken away from a user at different times. Some users may receive editing permissions when they create a user account. Other users may not receive editing permissions when they create a user account. There may be different levels of editing permissions.

In one embodiment, the user must pass a test to show he or she is a human and not a computer program before the user can enter suggested rankings for the result items in the results document. Such tests include CAPTCHAs.

In one embodiment, the user may only enter suggested rankings for the result items in the results document a limited number of times over a limited time period.

In one embodiment, the user and the other users are divided into one or more classes. The user and the other users may be in multiple classes at once. The user may be in a class or more than one class. In this embodiment, suggested rankings entered by a user are only used to adjust rankings made in response to another user's search query if the two users are of the same class, for example both users being of the class "interested in sports." It may be appreciated that users may be assigned to classes in many ways and not just according to interest area. Other kinds of classes may be: users who are female, users who are over the age of 25, users who have a college education, users who work in the computer software industry, and so on. Classes can be based on age, demographics, location, interests, hobbies, likes, occupations, experiences, education, and the like. It may be appreciated that classes may be automatically assigned, assigned by running a computer program, assigned by manual intervention, or specified by the user. In this embodiment where the user and the other users are divided into one or more classes, act 204 may be performed by a method comprising: retrieving from the database a previously suggested rankings of result items that were provided by other users in the same class as the user; wherein the previously suggested rankings of result items contains suggested rankings for zero, one, or more of the result items in the set of result items; wherein the previously suggested rankings of result items in the database were provided by the other users, the other users having conducted a search using the same search query earlier in time, the other users being in the same class as the user; wherein the previously suggested rankings of result items in the database were provided by the other users in the same class as the user by entering suggested rankings of result items, the result items having been displayed in a prior results document that was returned after the other users in the same class as the user conducted a search using the same search query earlier in time; adjusting the rankings of the set of result items based on the retrieved previously suggested rankings of result items that were provided by the other users in the same class as the user to obtain an adjusted rankings of the set of result items.

Figure 3A:
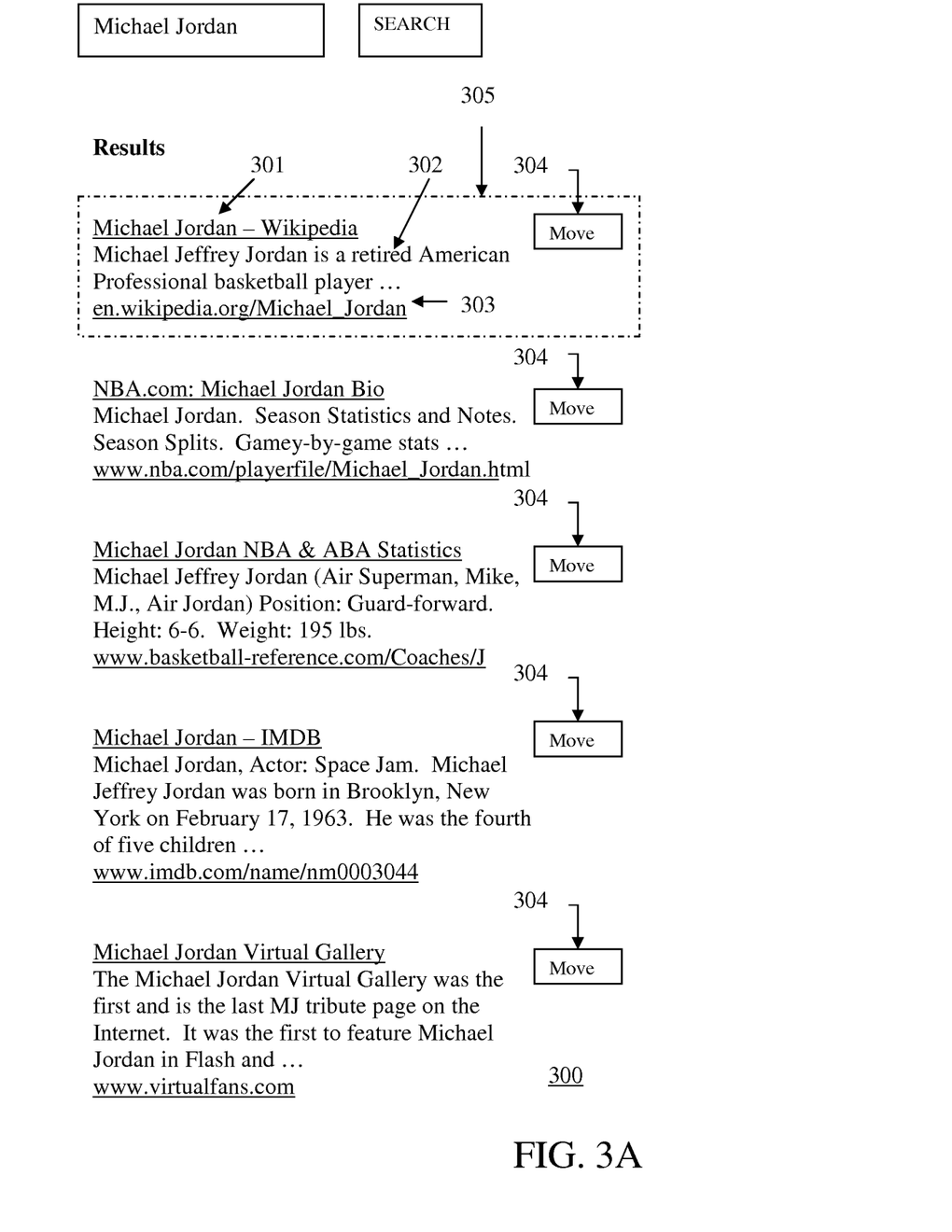
FIG. 3A is a diagram illustrating an exemplary results document that could be produced in accordance with one embodiment of the present invention.

FIG. 3A is a diagram illustrating an exemplary results document 300 displaying the ranked results returned in response to a search query. The result items on results document 300 are exemplary result items returned by search engine 125 for the exemplary search "Michael Jordan." In one embodiment, each result item may be listed with a title 301, a summary of relevant content 302, and URL 303. The title 301 may be linked to the document. In other embodiments, the result items may be listed with more, less, or different information. In some embodiments, there may be a "next page" or "more results" button that will result in more result items being displayed, in some cases on a new page.

In one embodiment, the user may enter suggested rankings for one or more result items listed on the results document by selecting and moving the one or more result items to a higher or lower ranking. In some embodiments, this may be accomplished by clicking on the title 301, summary of relevant content 302, or URL 303 to select the result item and then moving the result item, for example by dragging the result item to a new rank. In one embodiment, this may be accomplished by clicking on the area around the result item (shown with broken lines) 305 and moving the result item, for example by dragging the result item to a new rank. In one embodiment, some or all result items may be accompanied by a move button 304 such that the user may click the move button and then drag the item to a new location in the list that corresponds to a new ranking. Selecting and moving the one or more result items to a higher or lower ranking can be accomplished in many ways, using many different kinds of user interface, and the above examples of ways to select and move a result item are exemplary and not limiting. The new user-suggested ranking may be stored as a new user-suggested ranking in the user rankings database 128.

In one embodiment, the results document includes user interface elements next to one or more result items. The user may enter suggested rankings for the one or more result items via the user interface elements. In one embodiment, some or all result items may be accompanied by a text input box where the user may enter a new suggested ranking. The new user-suggested ranking may be stored as a new user-suggested ranking in the user rankings database 128.

Those skilled in the art will recognize that many different kinds of user interface actions may be used to allow the user to enter a new user-suggested ranking and cause that ranking to be stored in the user rankings database 128. The foregoing description of preferred embodiments provides illustration and description, but is not intended to be exhaustive or to limit implementation to the precise forms disclosed. Modifications and variations are possible in light of the above teachings or may be acquired from practice of the invention.

In one embodiment, once the user suggests a new ranking for a result item, the results of the re-ranking are displayed immediately to the user. The result item is moved to the new ranking suggested by the user. An optional method of displacement may be used: If the result item was moved up, the old result item at the re-ranked location is re-ranked down by one. If that old result item displaces a second result item, that second result item can also be moved down by one. The re-rankings downward continue until no result items are displaced. The re-rankings downward will stop when a result item is re-ranked into the now empty location where the result item with the new user-suggested ranking had originally been ranked. If the result item was moved down, the old result item at the re-ranked location is moved up by one. If that old result item displaces a second result item, the second result item can also be moved up by one. The re-rankings upward continue until no result items are displaced. The re-rankings upward will stop when a result item is re-ranked into the now empty location where the result item with the new user-suggested rank had originally been ranked.

The user may continue suggesting new rankings for result items. The results of each of these re-rankings may be displayed immediately to the user upon entry of each of the re-rankings. The term "immediately" means a short period of time that is at least within the same session of use of the search engine. For example, a delay of less than 5 seconds would qualify as "immediately."

The new rankings entered by the user can be an arbitrary distance away from the original ranking of the item. For instance, the user is not limited to only promoting an item up by one rank or demoting an item down by one rank. The user could re-rank an item ranked at 20 up to rank 1. The suggested locations from the user may move at least one result item to a location at least two positions above or two positions below the at least one result item's location in the first order. The move may be in response to receiving a single suggested location from the user—for example, in response to receiving a single suggested location from the user, the system may move at least one result item to a location at least two positions above or two positions below the at least one result item's location in the first order. Furthermore, if multiple pages of results are involved, the user could re-rank an item from a certain page on to a different page. This might be accomplished by clicking on an item on a first page to select it, moving the cursor to a button indicating a second page of search results causing a change to the second page, and placing the selected item at a new rank on the second page.

Figure 3B:
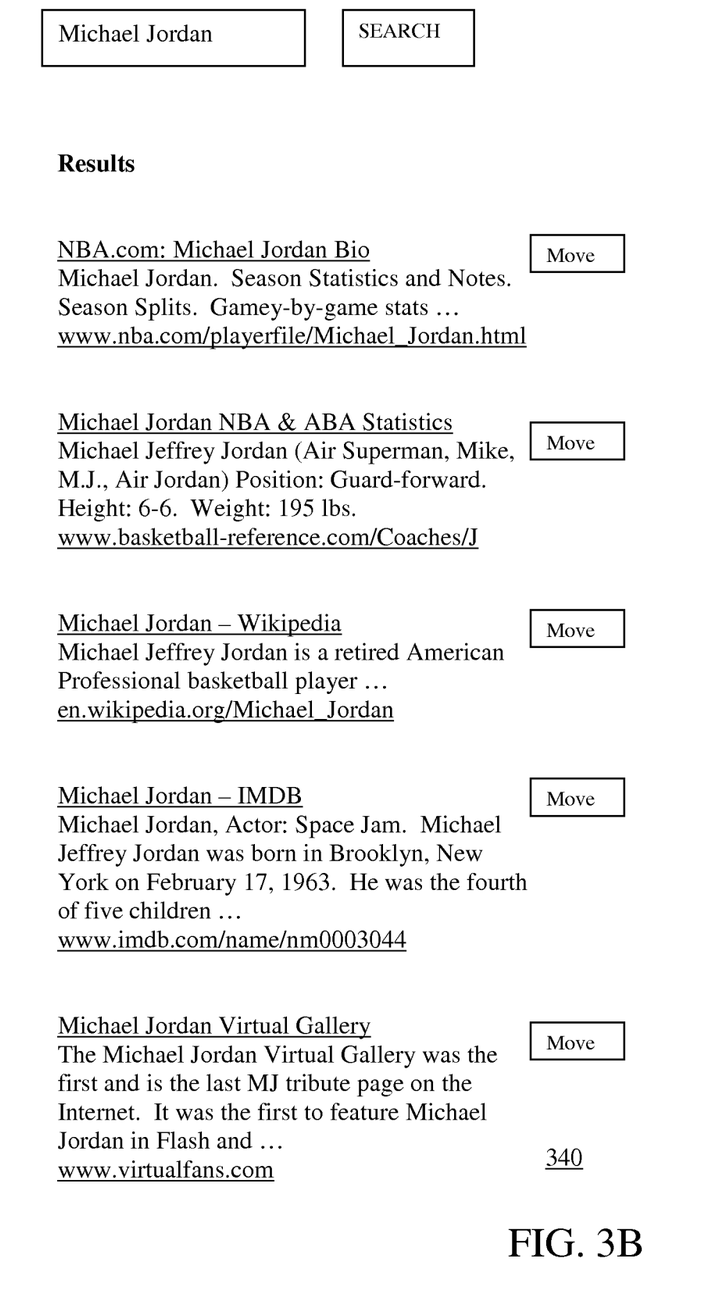
FIG. 3B is a diagram illustrating an exemplary results document that could be produced after acceptance of some user-suggested rankings in accordance with one embodiment of the invention.

FIG. 3B is a diagram illustrating an exemplary results document 340 displaying the ranked results after the user inputs user-suggested rankings on the exemplary results document 300. The results document 340 shows the outcome after the user has re-ranked the item "Michael Jordan—Wikipedia" to be in the third rank.

If the computer-generated ranking does not change, then the next user who performs a search on the same query ought to view a results document identical to that presented to the current user after the current user's suggested rankings had been entered (with some leeway for potential time delays in updating databases and propagating changes). However, if the computer-generated ranking changes, then the next user may see a results document that is not identical to the results document presented to the current user.

Figure 3C:
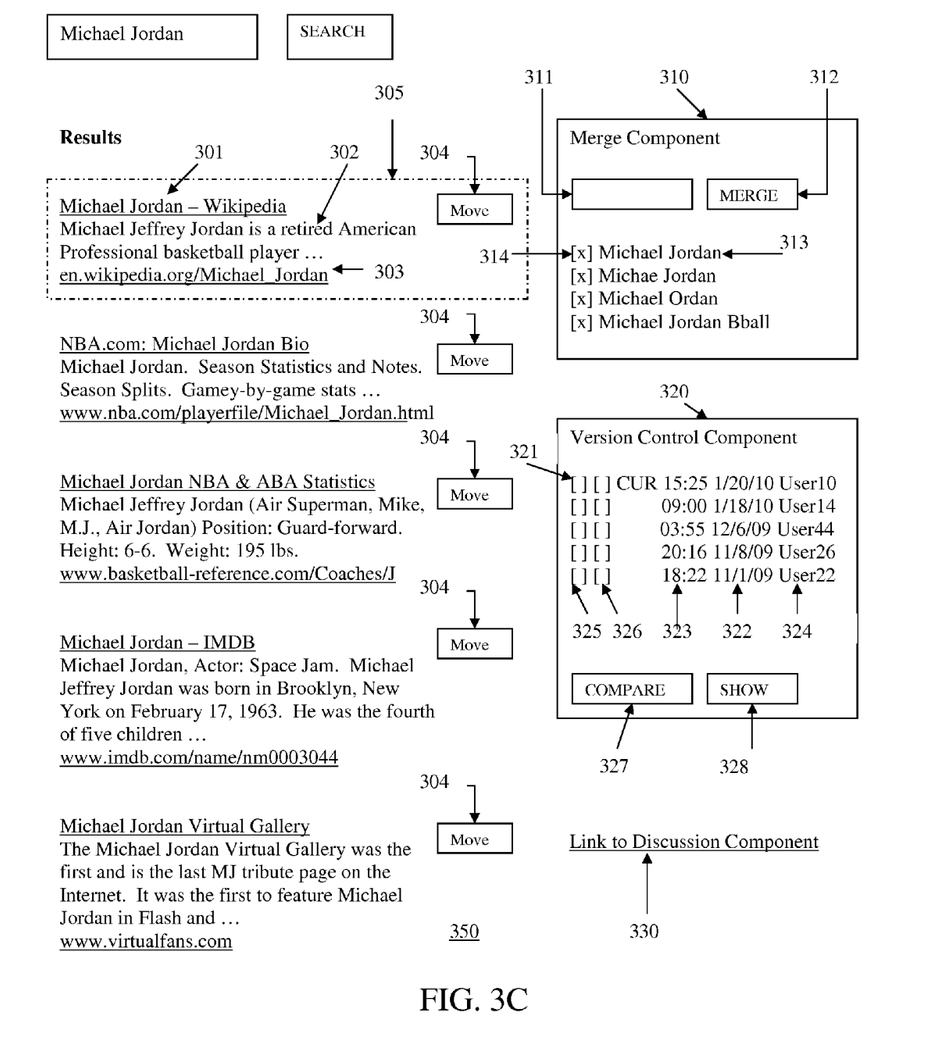
FIG. 3C is a diagram illustrating an exemplary results document with additional components that could be produced in accordance with one embodiment of the invention.

FIG. 3C is a diagram illustrating an exemplary results document 350 displaying the ranked results returned in response to a search query, and in which additional optional interface components are shown. In one embodiment, a merge component 310 is included on the results document. In one embodiment, search queries can be merged so that multiple queries become joined in a merged group. In this embodiment, when a search is performed on any of the queries in the group, then user-suggested rankings made on prior search results for any of the queries in the group are used to adjust the search rankings. Thus, in this embodiment, the search query received from the user is one search query from a set of merged search queries, and adjusting the rankings of the set of result items by a method of using human suggested rankings is performed by a method comprising: retrieving from the database a previously suggested rankings of result items that were provided by a other users; wherein the previously suggested rankings of result items contains suggested rankings for zero, one, or more of the result items in the set of result items; wherein the previously suggested rankings of result items in the database were provided by the other users, the other users having conducted a search using any search query from the set of merged search queries earlier in time; wherein the previously suggested rankings of result items in the database were provided by the other users by entering suggested rankings of result items, the result items having been displayed in a prior results document that was returned after the other users conducted a search using any search query from the set of merged search queries earlier in time; adjusting the rankings of the set of result items based on the retrieved previously suggested rankings of result items that were provided by the other users to obtain an adjusted rankings of the set of result items.

The results document may include a merge component 310 that displays information about one or more sets of merged search queries or a link to a merge component 310 that displays information about one or more sets of merged search queries. The results document may include user interface elements that may be used to add one or more search queries to a set of merged search queries or to remove one or more search queries from a set of merged search queries. In one embodiment of the merge component 310, a text input field 311 allows entering a search query and a merge button 312 causes that search query to be added to the set of merged search queries 313. The set of merged search queries may include the search query submitted by the user to generate the current results document. Each search query in the set of merged search queries may return the same results document, and new user suggested rankings of items on the results document may be used to adjust the rankings of items when searching for any of the merged search queries. An unmerge button 314 next to each currently merged search query may, when clicked, cause the search query to be removed from the set of merged search queries.

In one embodiment, the results document includes a version control component 320 that displays information about one or more previous versions of the results document or a link to a version control component 320. The version control component would allow the user to view the results document when only user-suggested rankings up to a specific time are applied. For example, the user can choose to take out the most recent user-suggested rankings. The version control component 320 displays information about one or more previous versions of the results document. Each of the one or more previous versions of the results document may display a past adjusted rankings of the set of result items, the past adjusted rankings of the set of result items being generated at the current time or having been generated at a previous time by a method of using human suggested rankings comprising: retrieving from the database a previously suggested rankings of result items that were provided by a other users; wherein the previously suggested rankings of result items contains suggested rankings for zero, one, or more of the result items in the set of result items; wherein the previously suggested rankings of result items in the database were provided by the other users, the other users having conducted a search using the same search query earlier in time; wherein the previously suggested rankings of result items in the database were provided by the other users by entering suggested rankings of result items, the result items having been displayed in a prior results document that was returned after the other users conducted a search using the same search query earlier in time; wherein the other users entered the suggested rankings of result items prior to a specific time, the specific time being associated with the one or more previous versions of the results document; adjusting the rankings of the set of result items based on the retrieved previously suggested rankings of result items that were provided by the other users to obtain an adjusted rankings of the set of result items.

In one embodiment of the version control component 320, the component may include information about the current version of the results document in a current version display 321. The component may include date information 322, time information 323, and user information 324 for previous versions of the results document, a previous version of the results document being a document displaying the ranking of the set of result items adjusted according to the user-suggested rankings of items provided by users up to a specific time that is earlier than the current time, the specific time being associated with the previous version of the results document. The date information 322 and time information 323 may reflect the specific earlier time that is associated with the previous version of the results document. The user information 324 may reflect the last user to enter a user suggested ranking before or at that specific time. Each of the current and previous version listings may include a first checkbox 325 and a second checkbox 326 allowing the selection of two previous versions of the results document simultaneously. The user may choose to view a differences between two or more previous versions of the results document. A display of the differences between the two selected previous versions may appear when the user clicks the compare button 327. The show button 328 may cause a previous version to be displayed, the user choosing which previous version to display using the first checkbox 325 or another interface element. Differences can be computed, for example, by generating the two selected versions of the results document and using diff or a diff-type tool on the two versions.

In one embodiment, the results document includes a discussion component for user discussion or a link to a discussion component 330 for user discussion, the discussion component for user discussion comprising a wiki, a forum, a bulletin board, a chat room, or other interface component configured for user discussion. In some embodiments, the discussion component is a wiki that is tied to a search query. The wiki is only displayed after users have searched upon the particular query. The wiki would allow users to leave messages for each other, so as to discuss how result items should be ranked for the particular query. Similarly, a forum, discussion board, or bulletin board can be used in place of a wiki. Also, a chat room can be used to allow communication between users who are currently viewing search results for the same query. Similarly, the discussion component may be tied to a set of substantially similar search queries rather than a single search query.

In embodiments allowing merging of search queries, the discussion component can be tied to a merged group so that the same discussion component is displayed for all queries in the merged group. For instance, the same wiki could be displayed for both search queries A and B, if queries A and B are in the same merged group.

Figure 4:
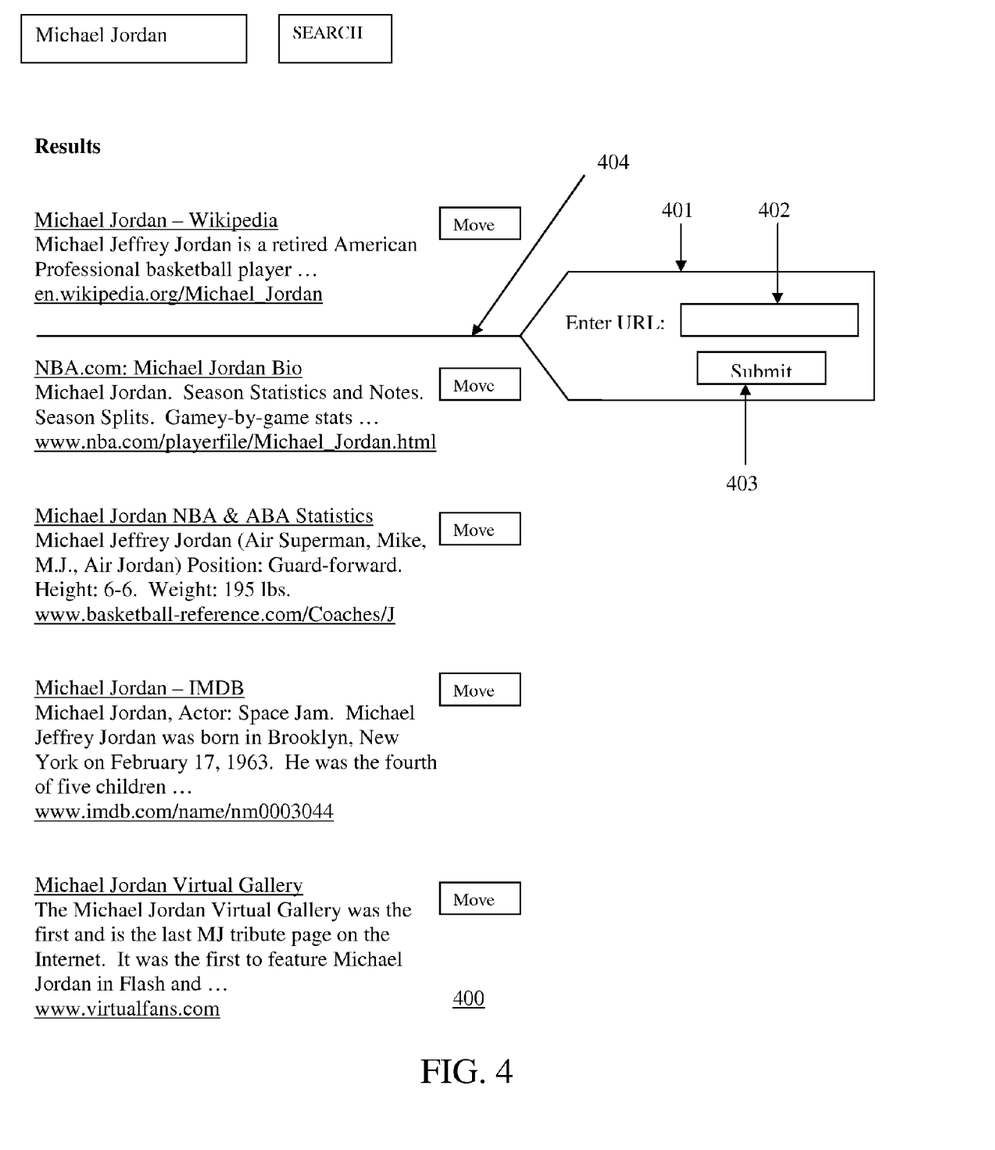
FIG. 4 is a diagram illustrating an exemplary results document with components allowing the user to enter a new result item that could be produced in accordance with one embodiment of the invention.

FIG. 4 is a diagram illustrating an exemplary results document 400 that can be displayed in some embodiments wherein the user can enter a new result item that is not in the current list of result items. Submission box 401 may include a text box 402 and submit button 403. The submission box 401 may be displayed when the user has indicated that he wishes to add a new result item, for instance by pressing a button indicating submission or by moving the cursor to a location between result items 404. Text box 402 accepts an identifier for the new result item, such as a URL for a web page. The user can then submit the entry by pressing the submit button 403 or performing some other user action. A title, description, and other necessary information can be generated by parsing the web page at the indicated URL. Alternatively, the title, description, or other necessary information could be collected by user submission via interface components such as text boxes.

The new result item may be ranked at the ranking that the user has designated, for instance via his choice of where to place the cursor. In other words, a user-suggested ranking for this result item may be entered into the user rankings database, which can be used to adjust the rankings of search results for future users according to methods previously described. For example, in the exemplary results document 400, the submission box 401 is positioned to result in the new result item being placed at the second ranking in the search results.

By adjusting search result rankings with user-suggested rankings, users may receive rankings of result items that are more accurate with respect to the rankings that users believe the result items should have.

The foregoing description of preferred embodiments of the present invention provides illustration and description, but is not intended to be exhaustive or to limit the invention to the precise forms disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

The invention claimed is:

1. A method for ordering search engine results, the method performed by a computer system having access to a database, the method comprising:
   receiving at the computer system a search query from an end user;
   performing a search over a set of data in response to the search query, the set of data being at the computer system or accessible to the computer system;
   generating a set of result items returned from the search over the set of data and a first order of the set of result items;
   producing an adjusted order of the set of result items by a method of using human suggested locations comprising:
      providing in the database a plurality of previously suggested locations of result items;
      wherein the previously suggested locations were received from other end users from one or more prior results documents that were returned in response to one or more requests from the other end users to perform a search using the same search query earlier in time;
      determining from the plurality of previously suggested locations that one of the previously suggested locations is a last user-suggested location for a first result item, wherein the last user-suggested location for the first result item is the previously suggested location for the first result item that was most recently received from the other end users;
      moving the first result item to the last user-suggested location of the first result item;
      wherein, as a result of determining from the plurality of previously suggested locations that one of the previously suggested locations is the last user-suggested location for the first result item and moving the first result item to the last user-suggested location of the first result item, the last user-suggested location for the first result item dictates the location of the first result item in the adjusted order;
   providing the adjusted order of the set of result items to the end user in a results document;
   receiving one or more suggested locations from the end user for result items in the results document and storing the suggested locations from the end user in the database;
   using the suggested locations from the end user at a later time to adjust an order of a later set of result items returned in response to a later search query of a later end user.

2. The method of claim 1, wherein the method of producing the adjusted order of the set of result items by a method of using human suggested locations further comprises:
   for each of one or more additional result items besides the first result item, performing a method comprising:
      determining from the plurality of previously suggested locations that one of the previously suggested locations is the last user-suggested location for the additional result item;
      moving the additional result item to the last user-suggested location for the additional result item;
      wherein, as a result of determining from the plurality of previously suggested locations that one of the previously suggested locations is the last user-suggested location for the additional result item and moving the additional result item to the last user-suggested location of the additional result item, the last user-suggested location for the additional result item dictates the location of the additional result item in the adjusted order.

3. The method of claim 1, wherein the results document includes a discussion component for user discussion or a link to a discussion component for user discussion.

4. The method of claim 1, further comprising providing a version control component that allows the end user to view a previous version of the results document created by adjusting the locations of one or more result items according to user-suggested locations provided up to a specific time.

5. The method of claim 1, wherein the suggested locations from the end user are received via one or more interface components allowing selecting and moving one or more result items to a higher or lower location.

6. The method of claim 1, wherein receiving suggested locations from the end user comprises:
   providing one or more interface components configured to allow the end user to drag one or more result items to the suggested locations.

7. The method of claim 1, wherein the end user and the other end users are divided into one or more classes;
   wherein the end user is in a class;
   wherein only previously suggested locations of results items that were provided by other end users in the same class as the end user are used to produce the adjusted order of the set of result items.

8. The method of claim 1, wherein the suggested locations from the end user move at least one result item to a location at least two positions above or two positions below the at least one result item's location in the adjusted order.

9. The method of claim 1, further comprising:
   in response to receiving a single suggested location from the end user, moving at least one result item to a location at least two positions above or two positions below the at least one result item's location in the adjusted order.

10. The method of claim 1, wherein in response to two or more of the result items having the same last user-suggested location, the result item with the last user-suggested location provided at the latest time is moved to the last user-suggested location of the two or more result items and the other result items having the same last user-suggested location are moved to a lower location than the last user-suggested location of the two or more result items.

11. A system including at least one computer system having access to a database, the system configured to at least:
   receive at the computer system a search query from an end user;
   perform a search over a set of data in response to the search query, the set of data being at the computer system or accessible to the computer system;
   generate a set of result items returned from the search over the set of data and a first order of the set of result items;
   produce an adjusted order of the set of result items by:
      providing in the database a plurality of previously suggested locations of result items;
      wherein the previously suggested locations were received from other end users from one or more prior results documents that were returned in response to one or more requests from the other end users to perform a search using the same search query earlier in time;
      determining from the plurality of previously suggested locations that one of the previously suggested locations is a last user-suggested location for a first result item, wherein the last user-suggested location for the first result item is the previously suggested location for the first result item that was most recently received from the other end users;

moving the first result item to the last user-suggested location of the first result item;

wherein, as a result of determining from the plurality of previously suggested locations that one of the previously suggested locations is the last user-suggested location for the first result item and moving the first result item to the last user-suggested location of the first result item, the last user-suggested location for the first result item dictates the location of the first result item in the adjusted order;

the system further configured to:

provide the adjusted order of the set of result items to the end user in a results document;

receive one or more suggested locations from the end user for result items in the results document and store the suggested locations from the end user in the database;

use the suggested locations from the end user at a later time to adjust an order of a later set of result items returned in response to a later search query of a later end user.

12. The system of claim 11, further configured to produce the adjusted order of the set of result items by being configured to:

for each of one or more additional result items besides the first result item:

determine from the plurality of previously suggested locations that one of the previously suggested locations is the last user-suggested location for the additional result item;

move the additional result item to the last user-suggested location for the additional result item;

wherein, as a result of determining from the plurality of previously suggested locations that one of the previously suggested locations is the last user-suggested location for the additional result item and moving the additional result item to the last user-suggested location of the additional result item, the last user-suggested location for the additional result item dictates the location of the additional result item in the adjusted order.

13. The system of claim 11, wherein the results document includes a discussion component for user discussion or a link to a discussion component for user discussion.

14. The system of claim 11, further configured to provide a version control component that allows the end user to view a previous version of the results document created by adjusting the locations of one or more result items according to user-suggested locations provided up to a specific time.

15. The system of claim 11, wherein the suggested locations from the end user are received via one or more interface components allowing selecting and moving one or more result items to a higher or lower location.

16. The system of claim 11, wherein the system is configured to receive suggested locations from the end user at least by:

providing one or more interface components configured to allow the end user to drag one or more result items to the suggested locations.

17. The system of claim 11, wherein the end user and the other end users are divided into one or more classes;

wherein the end user is in a class;

wherein only previously suggested locations of results items that were provided by other end users in the same class as the end user are used by the system to produce the adjusted order of the set of result items.

18. The system of claim 11, configured to receive suggested locations from the end user and move at least one result item to a location at least two positions above or two positions below the at least one result item's location in the adjusted order.

19. The system of claim 11, configured to at least:

in response to receiving a single suggested location from the end user, move at least one result item to a location at least two positions above or two positions below the at least one result item's location in the adjusted order.

20. The system of claim 11, further configured that in response to two or more of the result items having the same last user-suggested location, the result item with the last user-suggested location provided at the latest time is moved to the last user-suggested location of the two or more result items and the other result items having the same last user-suggested location are moved to a lower location than the last user-suggested location of the two or more result items.

* * * * *